Patented Mar. 2, 1943

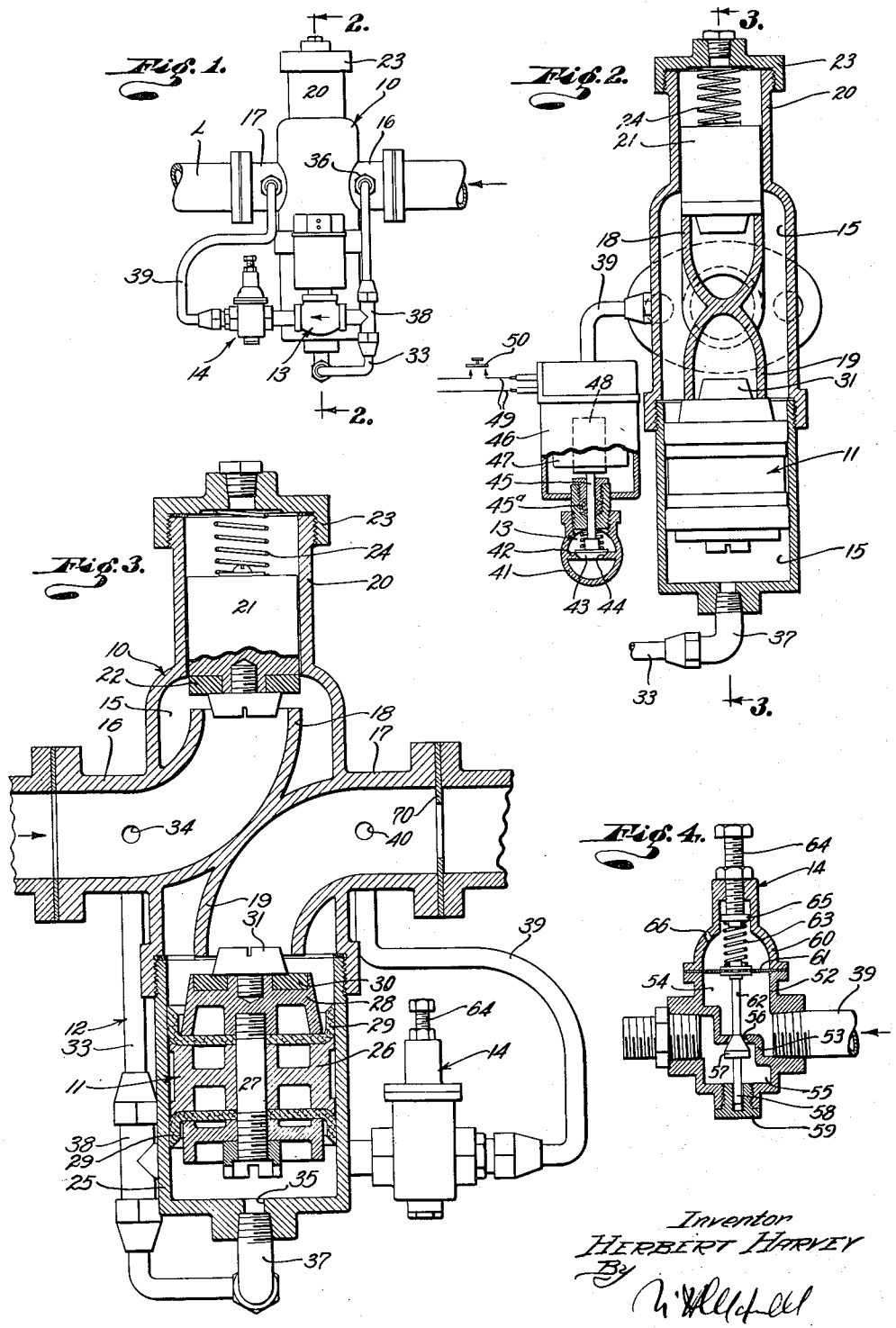

2,312,815

UNITED STATES PATENT OFFICE 2,312,815

VALVE MECHANISM

Herbert Harvey, Los Angeles, Calif., assignor to Leo M. Harvey, La Canada, Calif.

Application August 14, 1940, Serial No. 352,585

5 Claims. (Cl. 137—139)

This invention relates to valve mechanisms and relates more particularly to a self-regulating valve means for a fluid pressure line. A general object of this invention is to provide a simple, inexpensive and dependable valve means that assures the delivery of a given quantity of fluid in a given period of time in situations where the pressure of the fluid source may vary greatly from time to time.

In commercial clothes washing machines it is desirable to deliver given or known quantities of hot and cold water to the machines for the various cyclic or stage washing operations. A copending application of this applicant discloses a control mechanism for washing machines that controls the valve means and other elements of the machine for the stage or cyclic washing operations. In cases where the hot and cold water sources operate to supply water to the machine at uniform pressures the opening of the hot and cold water valves for given periods provides for the delivery of given quantities of water to the machine. However, commercial washing machines are usually installed where the pressures at the hot and cold water sources vary greatly so that the mere opening of a valve for a given period cannot assure the delivery of a given quantity of water to the machine. The supply lines for washing machines are quite large and the provision of effective pressure regulating valves in each water line in addition to the remote controlled cut off valves, greatly increases the cost of the installation.

Another object of this invention is to provide a single valve means for a water supply line of a commercial washing machine, or the like, that serves to assure the delivery of a given quantity of water to the machine during a given period when it is open, even though the water pressure may vary greatly.

Another object of this invention is to provide a valve means of the character referred to that may be opened and closed by a remote control mechanism and that operates to meter or measure the water delivery so that a given quantity of water is discharged during a given period, irrespective of fluctuations in the water supply pressure, thus serving both as a control valve and a measuring valve and eliminating the necessity for an expensive pressure regulating valve in the water supply line.

Another object of this invention is to provide a valve means of the character referred to that is compact and capable of installation at any selected point in the supply line, for example, at the washing machine.

A further object of this invention is to provide a valve means of the character referred to that is accurate in operation, serving to discharge substantially equal quantities of fluid during equal periods of time in installations where the supply pressure varies through a wide range, and that is adjustable or regulable to adapt it for effective use in situations where the ranges of pressure variations are widely different.

The various objects and features of my invention will be fully understood from the following detailed description of a typical preferred form and application of my invention, throughout which description reference is made to the accompanying drawing, in which:

Fig. 1 is a side elevation of the improved valve means provided by this invention. Fig. 2 is an enlarged, vertical, detailed sectional view taken as indicated by line 2—2 on Fig. 1 with the main valve closed. Fig. 3 is an enlarged vertical detailed sectional view taken as indicated by line 3—3 on Fig. 2 with the main valve open, and Fig. 4 is a vertical detailed sectional view of the pressure responsive means for determining the position of the main closure.

The valve means of the present invention may be said to comprise, generally, a valve body 10 adapted to be connected in a fluid supply line L, a piston type closure 11 in the body 10 responsive to fluid pressure, means 12 for applying fluid pressure to the closure 11 to operate the same, an electrically operated pilot valve 13 controlling said means 12 to open and close the closure 11, and means 14 responsive to the pressure in the fluid supply line L for regulating said means 12 to vary the open position or setting of the closure 11.

The valve body 10 is a hollow structure having a main fluid chamber 15. An inlet fitting or part 16 projects from one side of the body 10 and an outlet part 17 projects from the other side of the body. The body 10 is adapted to be connected in the water or fluid pressure supply line L and the inlet and outlet parts 16 and 17 may be flanged as illustrated or may be threaded to facilitate the mounting of the valve in the line. A curved or elbow shaped member 18 extends inwardly from the inlet part 16 and its inner end is directed upwardly in the upper part of the chamber 15. A similar elbow-like member 19 extends inwardly from the outlet part 17 and has its inner end directed downwardly in the lower portion of the chamber 15. The lower end of the member 19 forms a seat for the main closure 11, as will be later described. A cylinder extension 20 is provided on the upper end of the body 10 and its interior is considerably smaller in diameter than the chamber 15. A plunger 21 operates in the cylinder extension 20 with substantial clearance and is provided at its lower end with a sealing ring 22 adapted to seal against the upper end of the inlet member 18. A threaded-on cap 23 closes the upper end of the extension 20 and a coiled spring 24 is arranged under compression between the upper end of the plunger 21 and the cap 23. Gravity and the spring 24 urge the plunger 21 downwardly so that its ring 22 normally seals against the inlet member 18. The spring-urged plunger 21 sealing against the inlet member 18 assures the maintenance of a sufficient fluid pressure in the inlet and the means 12 for the proper operation of the closure 11. A cylinder section 25 is threadedly connected with the lower end of the body 10 and its interior forms an extension of the chamber 15. The cylinder section 25 carries the main closure 11.

The closure 11 is adapted to engage up against the lower end of the outlet member 19 to cut off the flow of fluid through the valve and is adapted to assume various positions with respect to the member 19 to provide for the controlled or measured discharge of fluid. The closure 11 is of the piston type and includes a central main section 26 and a shaft or stem 27 extending through the section 26 to project from its opposite ends. Heads 28 are secured on the projecting end portions of the stem 27. Oppositely facing cup-leathers 29 are clamped between the ends of the main section 26 and the heads 28 and slidably seal with the inner wall of the cylinder section 25. The cup-leathers 29 are arranged to make the closure 11 responsive to fluid pressure below, as well as above, the closure. A sealing ring 30 is recessed in the upper end of the upper head 28 and is retained in place by a screw 31 having a tapered or frusto-conical head 31. The sealing ring 30 is adapted to engage upwardly against the lower end of the outlet member 19 to cut off the flow of fluid through the valve.

The frusto-conical head 31 is proportioned to enter the lower portion of the outlet member 19 when the valve closure 11 is in the closed position, as well as in various open positions. With the sealing ring 30 engaged against the outlet member 19 the flow through the fluid supply line L is cut off. The closure 11 is, in effect, a differential piston when fully closed and when in a partially closed position. With the closure 11 in a position such as illustrated in Fig. 3 of the drawing, the pressure in the outlet member 19 is less than that in the chamber 15 so that the area at the lower end of the closure 11 exposed to the fluid pressure in the chamber 15 is greater than that on the upper end of the closure and the pressure acting on the lower end of the closure urges the closure upward toward its closed position. The head 31 forms an extension of the closure 11 that projects into the outlet member 19 at all positions of the closure to reduce the effective area of the upper end of the closure that is exposed to the supply of fluid pressure in the chamber 15.

The means 12 is operable to deliver fluid pressure to the lower end of the chamber 15 under the closure 11 to operate and control the closure. The means 12 comprises a pressure line 33 communicating with the fluid pressure supply line L or with the high pressure side of the valve and communicating with the lower portion of the chamber 15. A lateral port 34 is formed in the inlet part 16 and a port 35 is provided in the lower wall of the cylinder section 25 to communicate with the lower end of the chamber 15. Suitable fittings 36 and 37 connect the ends of the pressure line 33 in the ports 34 and 35 respectively. It will be seen that the line 33 serves to deliver fluid pressure to the chamber 15 below the closure 11. With the spring held arm 21 in the closed position pressure builds up in the inlet member 16 so that a maximum pressure may be applied to the under side of the closure 11 through the line 33 to hold the closure in its closed position.

It has been found that the main valve operates more effectively and without chattering when there is a suitable back pressure in the down-stream side of the line L. Suitable means may be employed to produce this back pressure, for example, a plate 70 having a restricted opening may be clamped between the flanged ends of the outlet part 17 and the line section connected therewith.

The pilot valve 13 serves to control the main closure 11 by relieving the pressure or bleeding the pressure from the line 33. The valve 13 is electrically operated for convenient remote control and may be such that it is either fully open or fully closed. The present invention is not primarily concerned with the details of the valve 13 as any suitable form of electrically operated or solenoid operated valve may be employed. In the construction illustrated a T 38 is interposed in the pressure line 33 and a bleed line 39 extends from the lateral arm of the T 38. The bleed line 39 extends to a selected point of discharge. In practice the line 39 may extend to a lateral port 40 in the outlet part 17 to discharge into the down-stream side of the water supply system. The pilot valve 13 is interposed in the bleed-line 39. The particular valve 13 illustrated comprises a valve body 41 interposed in the bleed line 39 and having a transverse partition 42 between its inlet and outlet sides. A valve member 43 is provided in the body 41 to control a port 44 in the partition 42. A stem 45 is provided on the valve member 43 and extends upwardly through a gland 45ᵃ on the body 41. A case 46 is mounted above the valve body 41 and houses a solenoid coil 47. The armature 48 of the coil 47 is connected with the valve stem 44.

The electrical leads 49 for the control and energization of the coil 47 may extend to any selected control mechanism, for example, they may extend to a timing mechanism that is operable to complete the circuit to the coil 47 at given times and for given intervals. Thus the valve 13 is adapted for control by a timing mechanism or control mechanism that provides for the stage operation or cyclic operation of a commercial washing machine. In the drawing I have shown a simple manual switch 50 for controlling the circuit of the solenoid coil 47, it being understood that this is merely to complete the showing and is not to be construed as limiting. When the coil 47 is de-energized the valve member 43 is in its closed position so that the bleed line 39 is closed and full fluid pressure is maintained on the lower end of the closure 11 to hold the same in its closed position. When the coil 47 is energized the valve member 43 is moved to its open position and fluid pressure is free to bleed out of the pressure line 33 through the bleed line 49 so that the pressure at the under side of the closure 11 is relieved and the closure may move down under the action of the fluid pressure on its upper end and by gravity. It will be seen that opening and closing of the valve 13 results in substantially simultaneous opening and closing of the main closure 11.

The means 14 is an important element of the valve system or means. The means 14 is responsive to the pressure on the water or supply fluid, when the closure 11 is in an open position, to vary the flow through the bleed line 39 and thus control the pressure applied to the lower end of the main closure 11. This bleed flow-regulating action of the means 14 is such that a decrease in pressure on the supply fluid results in an increase in flow through the bleed line 39 so that the main closure 11 opens wider and an increase in the pressure on the supply fluid results in a decrease in the flow through the bleed line 39 so that the main closure 11 is moved toward its closed position to reduce the flow through the outlet part 17. Thus the means 14 controls the main closure 11 through the medium of the bleed flow to provide for the flow or discharge of a given volume of water or fluid for any given time interval regardless of the pressure on the supply fluid and regardless of variations in this pressure.

The means 14 comprises a flow regulating valve connected in the bleed line 39. The type and details of this regulating valve may be varied greatly without departing from the invention. In the form of the invention illustrated the regulating valve includes a body 52 having a partition 53 between its high pressure passage 54 and its low pressure passage 55. The valve body 52 is connected in the bleed line 39 to have its passages 54 and 55 communicate therewith. The partition 53 has a port 56 controlled by a needle-type valve member 57. A lower stem 58 of the valve member 57 may be guided by a plug 59 threaded into the valve body 52. The high pressure passage or inlet passage 54 extends to the top of the body 52. A dome or hollow cap 60 is secured to the upper side of the valve body 52. A flexible diaphragm 61 is arranged across the upper end of the high pressure passage or inlet passage 54 and may have its edge portion clamped between the cap 60 and the body 52. The diaphragm 61 separates the passage 54 from the interior of the head 60. A stem 62 on the valve member 57 is connected with the diaphragm 61 so that the diaphragm controls the valve member 57. The parts are related so that an increase in the fluid pressure acting on the diaphragm 61 moves the valve member 57 toward its closed position. Regulable spring means acts on the diaphragm 61 to oppose the fluid pressure and to urge the valve member 57 toward its open position. This spring means may comprise a compression spring 63 arranged in the interior of the hollow cap 60 to bear against the upper side of the diaphragm 61. A screw 64 is threaded through an opening in the upper end of the cap 60 and carries a plate or ring 65 which bears against the upper end of the spring 63. The downward pressure exerted on the diaphragm 61 by the spring 63 may be regulated or varied by operating or turning the screw 64. A vent 66 may connect the interior of the head 60 with the atmosphere.

In operation it will be assumed that the inlet part 16 is connected with a source of fluid under pressure, say water, and that the coil 47 is controlled by the switch 50 or a timing mechanism. The closure 11 may normally occupy its closed position where the sealing ring 30 engages against the lower end of the member 19. With the closure 11 in this position the sealing ring 22 of the plunger 21 seals against the inlet member 18 and the valve member 43 of the means 13 is closed. Energization of the solenoid coil 47 results in opening of the closure member 11. When the coil 47 is energized the valve member 43 is moved to its open position and fluid pressure is free to bleed from the pressure line 38 through the bleed line 39. This reduces the fluid pressure applied to the lower end of the closure 11 and the closure moves downwardly by gravity and under the action of the fluid pressure on its upper end. Opening of the closure member 11 is accompanied by opening of the spring held plunger 21 and the water or fluid is free to flow through the chamber 15 and outlet member 19 to discharge down the line L.

Opening of the valve member 43 of the means 13 results in the flow of fluid through the bleed line 39 and the pressure on this fluid acts upon the diaphragm 61. Fluid pressure acting on the diaphragm 61 moves the valve member 57 toward its closed position. The position assumed by the valve member 57 depends upon the fluid pressure in the bleed line 39 and, therefore, upon the pressure on the fluid in the inlet part 16 and the supply line. If the fluid pressure in the bleed line 39 is high the valve member 57 is moved to a position where it greatly restricts the flow through the bleed line and pressure builds up in the bleed line, the supply line 13 and the lower part of the chamber 15 under the closure 11. This building up of pressure under the closure 11 results in upward movement of the closure and the closure assumes a position where it restricts the discharge of fluid through the outlet member 19. As above described the closure 11 is, in effect, a differential piston and is responsive to fluid pressure applied to its under side. With the closure 11 in a position where it materially restricts the discharge of fluid through the outlet member 19 the quantity of fluid discharged during a given period is not proportional to the pressure on the supply of the fluid, this quantity being determined by the position of the closure member 11 which in turn is dependent upon the position assumed by the pressure responsive diaphragm operated closure member 57 of the means 14.

In the event that the water or fluid is being supplied to the valve means under a low pressure when the closure 11 is open the fluid pressure in the bleed line 39 is, of course, proportionately low. When there is a low pressure in the bleed line 39 the spring 63 brings the closure member 57 to a position where there is a substantial flow through the port 56, thus allowing a substantial flow through the bleed line 39. This relatively free flow through the bleed line 39 produces a marked decrease in the pressure acting on the under side of the closure 11 and the closure assumes a position where there is an increased flow of fluid through the outlet member 19. Accordingly, the rate of flow through the valve means is not reduced because of a reduction in the pressure on the supply fluid but a given or selected quantity of fluid is discharged through the valve means for a given or selected time. The screw 64 may be adjusted to provide for the proper operation of the valve means in a situation where the pressure on the supply fluid varies within a given range.

The valve means of the invention is operable to provide for the delivery of a given quantity of fluid during a given time interval in installations where the pressure on the supply fluid varies greatly. The valve means operates both as a control valve or cut-off and as a metering or measuring means. The inclusion of the automatic regulating means 14 in the valve stem eliminates the necessity for interposing a large, expensive pressure regulating valve in the supply line ahead of the cut-off valve. The automatic regulating means 14 is small and inexpensive and serves to automatically govern the remotely controlled cut-off valve so that the valve operates as a time controlled metering or measuring valve. The valve means operates without water hammer and is accurate in its fluid measuring action.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. Means for controlling delivery from a fluid pressure supply line including a main valve comprising a body interposed in the line, and a closure movable in the body in response to applied fluid pressure and operable to cut off and regulate flow from the supply line, a pressure conduit for conducting fluid pressure from the supply line to the body to urge the closure toward its closed position, a bleed line of much smaller fluid capacity than the supply line, and connected with the pressure conduit as an appendage of the body, for bleeding fluid pressure from the pressure conduit, a separate valve in the bleed line operable by increased pressure in the bleed line to decrease the flow through the bleed line and operable to allow an increased flow through the bleed line upon a reduction in pressure in the bleed line whereby the closure is made to pass a given volume of fluid in a given time regardless of the pressure in the supply line, and a separate valve in the bleed line at the upstream side of the second named valve relative to the direction of flow in the bleed line for closing the bleed line to cause closing of the closure.

-2. Means for controlling delivery from a fluid prssure supply line including a main valve comprising a body interposed in the line, and a closure movable in the body in response to applied fluid pressure and operable to cut off and regulate flow from the supply line, a pressure conduit for conducting fluid pressure from the supply line to the body to urge the closure toward its closed position, a bleed line of much smaller fluid capacity than the supply line, and communicating with the pressure conduit to be an appendage of the body and external thereof, for bleeding fluid pressure from the pressure conduit, a separate valve in the bleed line operable by increased pressure in the bleed line to decrease the flow through the bleed line and operable to allow an increased flow through the bleed line upon a reduction in pressure in the bleed line whereby the closure is made to pass a given volume of fluid in a given time regardless of the pressure in the supply line, and a separate electrically operated valve in the bleed line at the upstream side of the second named valve relative to the direction of flow in the bleed line for closing the bleed line to cause closing of the closure.

3. Means for controlling delivery from a fluid pressure supply line including a main valve comprising a body interposed in the line, and a closure movable in the body in response to applied fluid pressure and operable to cut off and regulate flow from the supply line, a pressure conduit external of the body for conducting fluid pressure from the supply line to the body to urge the closure toward its closed position, a bleed line of much smaller fluid capacity than the supply line, communicating with the pressure conduit to be an external appendage of the body, for bleeding fluid pressure from the pressure conduit, a diaphragm-operated valve in the bleed line separate from the main valve and comprising a diaphragm subjected to the pressure in the bleed line, and a closure operable by the diaphragm to decrease the flow through the bleed line upon an increase in the fluid pressure on the diaphragm and operable by the diaphragm to allow an increased flow through the bleed line upon a reduction in pressure in the bleed line whereby said closure is made to pass a given volume of fluid in a given time interval regardless of the pressure in the supply line, and a separate remotely controlled valve in the bleed line at the upstream side of the diaphragm-operated valve for closing the bleed line to cause closing of said closure.

4. Means for controlling delivery from a fluid pressure supply line including a main valve comprising a body interposed in the line, and a closure movable in the body in response to applied fluid pressure and operable to cut off and regulate flow from the supply line, a pressure conduit for conducting fluid pressure from the supply line to the body to urge the closure towards its closed position, a bleed line of much smaller fluid capacity than the supply line, communicating with the pressure conduit to be an external appendage of the body, for bleeding fluid pressure from the pressure conduit, a diaphragm-operated valve in the bleed line separate from the main valve and comprising a diaphragm subjected to the pressure in the bleed line, means for regulating said diaphragm, and a closure operable by the diaphragm to decrease the flow through the bleed line upon an increase in the fluid pressure on the diaphragm and operable by the diaphragm to allow an increased flow through the bleed line upon a reduction in pressure in the bleed line whereby said closure is made to pass a given volume of fluid in a given time interval regardless of the pressure in the supply line, and a separate remotely controlled valve in the bleed line at the upstream side of the diaphragm-operated valve for closing the bleed line to cause closing of said closure.

Means for controlling delivery from a fluid supply line comprising a main valve body having a cylinder chamber, an inlet to the chamber communicating with the supply line and an outlet from the chamber, a piston type closure in the chamber operable to cut off and regulate flow through the outlet, a pressure conduit external of the body for conducting fluid pressure from the supply line to the chamber to urge the closure to its closed position, a bleed line of much smaller capacity than the supply line extending from the pressure conduit to the outlet, a remotely controlled electrically operated valve external of said body for controlling communication between the pressure conduit and the bleed line, and means for compensating for variations in pressure in the supply line to provide for the discharge of fluid from the outlet at a given rate irrespective of such variations comprising a diaphragm-operated valve in the bleed line separate from the main valve and including a spring-loaded diaphragm subjected to the pressure in the bleed line, and a closure operable by the diaphragm to decrease the flow through the bleed line upon an increase in the fluid pressure on the diaphragm and operable by the diaphragm to allow an increased flow through the bleed line upon a reduction in pressure in the bleed line.

HERBERT HARVEY.